(12) United States Patent
Weymouth, Jr.

(10) Patent No.: US 7,615,180 B2
(45) Date of Patent: Nov. 10, 2009

(54) METHOD FOR INJECTION MOLDING WITH DIRECT INSERT THERMAL CONTROL

(75) Inventor: Russell F. Weymouth, Jr., Charlton, MA (US)

(73) Assignee: Gentex Optics, Inc., Simpson, PA (US)

( * ) Notice: Subject to any disclaimer, the term of this patent is extended or adjusted under 35 U.S.C. 154(b) by 808 days.

(21) Appl. No.: 11/178,203

(22) Filed: Jul. 8, 2005

(65) Prior Publication Data

US 2007/0007696 A1    Jan. 11, 2007

(51) Int. Cl.
*B29C 45/00* (2006.01)
(52) U.S. Cl. .................... 264/328.14; 264/328.16; 425/190; 425/552
(58) Field of Classification Search ............ 264/328.14, 264/328.16; 425/547, 548, 552, 185, 190, 425/195
See application file for complete search history.

(56) References Cited

U.S. PATENT DOCUMENTS

| | | | |
|---|---|---|---|
| 2,424,235 A | 7/1947 | Hoffer | |
| 3,044,121 A | 7/1962 | Wiskoff et al. | |
| 3,056,166 A | 10/1962 | Weinberg | |
| 3,356,131 A | 12/1967 | Smith | |
| 3,373,793 A | 3/1968 | Smith | |
| 3,387,334 A | 6/1968 | Belanger et al. | |
| 3,871,610 A | 3/1975 | Balsam | |
| 3,871,611 A | 3/1975 | Taketa | |
| 4,141,531 A * | 2/1979 | Strausfeld | 249/80 |
| 4,202,522 A | 5/1980 | Hanas et al. | |
| 4,364,878 A | 12/1982 | Laliberte et al. | |
| 4,518,338 A | 5/1985 | Hehl | |
| 4,664,854 A | 5/1987 | Bakalar | |
| 4,702,685 A * | 10/1987 | Fruntzek | 425/182 |
| 5,376,317 A | 12/1994 | Maus et al. | |
| 5,387,096 A | 2/1995 | Wieser | |
| 5,445,510 A | 8/1995 | Jackson, Jr. | |
| 5,512,221 A | 4/1996 | Maus et al. | |
| 5,562,935 A * | 10/1996 | Martin | 425/552 |
| 5,736,168 A | 4/1998 | Goyal et al. | |

(Continued)

FOREIGN PATENT DOCUMENTS

GB    1 395 203    5/1975

(Continued)

OTHER PUBLICATIONS

J.W. Nemec, W.Bauer, Jr., Rohm and Haas Company, Acrylic and Methacrylic Ester Polymers, Encyclopedia Of Polymer Science and Engineering,1985, pp. 234-299, vol. 1, Canada.

(Continued)

*Primary Examiner*—Jill L Heitbrink
(74) *Attorney, Agent, or Firm*—Keusey & Associates, P.C.

(57) ABSTRACT

A hardware configuration and related method for straight injection molding of ophthalmic lenses using thermal control fluid circulating within a closed channel located interior of the insert. The channel is closed by a no-leak valve. The adjusting body is equipped with a mating no leak valve. The valves seal over an operational distance L before the valves are opened to admit the thermal circulating fluid into the insert. The insert can be easily changed or shimmed without leaking and without having to change the insert configuration.

30 Claims, 2 Drawing Sheets

U.S. PATENT DOCUMENTS

| | | | |
|---|---|---|---|
| 5,783,233 | A | 7/1998 | Takahashi |
| 5,792,392 | A | 8/1998 | Maus et al. |
| 5,792,492 | A | 8/1998 | Takahashi |
| 5,972,252 | A | 10/1999 | Saito et al. |
| 6,156,242 | A | 12/2000 | Saito et al. |
| 6,276,656 | B1 | 8/2001 | Baresich |
| 6,290,882 | B1 | 9/2001 | Maus et al. |
| 6,312,628 | B1 | 11/2001 | Wieder et al. |
| 6,328,552 | B1 | 12/2001 | Hendrickson et al. |
| 6,521,146 | B1 | 2/2003 | Mead |
| 6,592,356 | B1 | 7/2003 | Lust et al. |
| 6,659,750 | B1 | 12/2003 | Overmyer et al. |
| 6,669,460 | B1 | 12/2003 | Tai et al. |
| 6,695,607 | B2 | 2/2004 | Chiu et al. |
| 2002/0036360 | A1 | 3/2002 | Nishimoto |
| 2003/0025240 | A1 * | 2/2003 | Moore et al. ............... 264/219 |
| 2003/0080448 | A1 | 5/2003 | Nishimoto et al. |
| 2003/0164565 | A1 | 9/2003 | O'Brien |

FOREIGN PATENT DOCUMENTS

| | | |
|---|---|---|
| JP | 60-245521 | * 12/1985 |
| JP | 3-93521 | * 4/1991 |
| WO | WO 03/051605 | 6/2003 |

OTHER PUBLICATIONS

W.O. Elliott, Injection Molding, Modern Plastics Encyclopedia, 1968, pp. 720-742, vol. 45/No. 1A, Sep. 1967, US.

George Galic, Steve Maus, Improved Plastic Molding Technology for Ophthalmic Lens & Contact Lens, Ophthalmic Lens Design and Fabrication, 1991, pp. 13-21, SPIE vol. 1529.

* cited by examiner

METHOD FOR INJECTION MOLDING WITH DIRECT INSERT THERMAL CONTROL

BACKGROUND OF THE INVENTION

1. Field of the Invention

The invention relates to a method and apparatus for rapid changeover of differently shaped inserts equipped with internal heating/cooling channels.

2. The Prior Art

Various direct and indirect temperature controlling systems are known for plastic injection molding, which is inherently a thermodynamic cycle process. Direct temperature control by circulating a fluid within a portion of the insert is often needed when utilizing metal inserts, as opposed to glass. Typically, these circulating channels communicate with additional channels located below or to the side of the insert. Sealing the channels is of great importance, as any fluid infiltration into the molding cavity will inhibit the production of acceptable lenses.

U.S. Pat. No. 6,290,882 shows the upper portion of fluid circulating channels 27 within the part-forming inserts in FIG. 1. These channels terminate in open-ended apertures that are presumably sealed with O-rings to corresponding apertures in the respective insert support plates, as shown in FIG. 5. Since the patent is related to thermodynamic control, there is no teaching of how the inserts are secured in place, or how an individual insert could be utilized to mold parts of different thicknesses.

U.S. Pat. No. 4,664,854 illustrates preferred electrical heating element 50 for mold 5 and water circulating heater 30 for mold 3, in FIG. 1. In order to maintain the channel in alignment, movable frame section B is clamped over a shoulder portion of mold 3. Such a configuration makes it difficult to exchange mold inserts as the equipment must cool down before disassembly. In addition, since the insert depends on a fixed distance between the parting line, the cooling channel and the locking shoulder, one insert cannot be height adjusted to mold lenses of different thicknesses.

The following three references, U.S. Pat. Nos. 5,512,221, 5,792,392 and 6,156,242 all show a single loop circulating channel which employs an O-ring on the input and output side to seal to a corresponding opening in the insert support plate.

The following two references, U.S. Pat. Nos. 5,783,233 and 5,792,492 both show a spiral loop circulating channel with one O-ring interior of the inner most loop and another O-ring exterior of the outer most loop.

Accordingly it would be desirable to provide direct thermal control while maintaining mold cleanliness and convenient insert exchange capabilities.

SUMMARY OF THE INVENTION

The invention relates to a hardware configuration and related method for performing an injection molding operation for ophthalmic lenses utilizing direct thermal control of insert temperature.

It is an object of the present invention to simplify the exchange of insert having thermal control fluid flowing therethrough.

It is another object of the present invention to maintain mold cleanliness during insert installation and removal.

It is yet another object of the present invention to streamline the insert height adjustment in a direct thermal control system.

It is a further object of the present invention to utilize metal inserts and improve the practice of sealing open channels to the underlying support surface.

It is another object of the present invention to provide higher efficiency and increased productivity in the making of lenses by providing better thermal control during the injection molding process.

These and other related objects according to the invention are achieved in a first method for protecting a part-forming surface of an insert from thermal control fluid that flows within the insert, by initially providing a valve on the insert to access a channel located within the insert. The insert is then installed into an injection molding machine equipped with a thermal fluid source. The valve is opened, during installation, to allow the source to communicate with the channel.

The insert includes a support surface opposite the part-forming surface, and the valve is installed in the support surface. A stub pin extends outwardly from the support surface in an axial direction. The valve extends axially outwardly from the support surface, parallel to the stub pin. The injection molding machine includes an adjusting body for supporting the insert and receiving the stub pin and valve. Shims may optionally be disposed between the support surface and the stand off post. The shims include apertures to accommodate the stub pin and valve.

The installing step includes axially sliding the insert into a receiver of the injection molding machine. The installing step further includes sliding the insert an axial distance to bring the stub pin into coupling range with a capture device. The capture device is a linearly-actuated capture device that extends radially inwardly to engage the stub pin. The opening step occurs over a range of axial displacement that is greater than the shim thickness.

The method further including the steps of withdrawing the insert out of the injection molding machine, and closing the valve, during withdrawal. The valve is normally biased into a closed position. The injection molding machine includes a no-leak mating valve, and said opening step comprises contacting the valve with the no-leak mating valve. The opening step includes, allowing the source to communicate with the channel only after a sealed connection is formed between the valve and the no-leak mating valve.

The providing step includes forming a channel within an insert top half, mounting the valve in an insert bottom half and joining the halves together to create an insert. The insert halves are made from metal and are electron beam welded together. Alternatively, the insert is equipped with two valves. This results in opening the two valves, during installation, so that the source communicates with the channel only after a sealed connection is formed between the two valves and their respective mates on the injection molding machine.

According to a second embodiment of the invention, there is a method of adjusting the position of a part-forming surface of an insert relative to an injection mold parting line including the steps of initially providing an insert assembly comprising an insert having an internal channel for circulating thermal control fluid therethrough and a no-leak valve which can be opened over a distance L. Next the position of the insert is adjusted by shimming the insert relative to a support surface of the injection molding machine. In this manner, distance adjustments less than L can be implemented without changing the valve so that one insert assembly can be used at multiple positions relative to the parting line of the injection molding machine.

The insert is provided with a stub pin which is engaged by a capture device on the injection molding machine. The adjusting step includes selecting a stub pin having a length Y sufficient to align with the capture device. The length of the stub pin to its engagement section is the sum of the shim height X and the distance Y from the support surface to the capture device. The stub pin length is increased an amount equal to the added shim height X.

The adjusting step comprises axially displacing the insert into the receiver, without the use of threaded bolts to draw the insert into position. The distance L comprises a distance extending parallel to the central axis of the receiver. This allows the molding lenses of similar curvature and different thickness with a single insert assembly. The lenses include finished and semi-finished lenses having varying thicknesses.

The improvements described herein allow the use of a single insert assembly, having a metal part-forming surface, and thermal control fluid circulating therein to be used to mold lenses of similar curvatures and different thicknesses. The insert assembly has the channel sealed by a no-leak valve upon axially withdrawing the insert assembly beyond the operational distance L of the valve.

In an apparatus embodiment of the invention, there is provided an injection molding machine having a thermal fluid source for circulating thermal fluid within a part-forming insert including an insert equipped with an internal channel, an adjusting body having a support surface for the insert, and a seal between the channel and the thermal fluid source that forms independently of the support surface.

The insert includes a normally closed valve located at the channel mouth. One valve may be located at the channel inlet with a second valve at the channel outlet, i.e. the points at which the internal channel enters and exits the insert. A corresponding number of mating valves are disposed within the adjusting body. The valves mate and seal before opening. The valves seal before the insert contacts the support surface. The valves seal as the insert approaches the support surface. The valves seal as a function of axial progress of the insert toward the adjusting body. A shim or shims of various thicknesses may be disposed between the insert and the support surface. Since the valves can mate, seal and open over an operative range L, they can function just as easily with shims that separate the insert from the adjusting body and prevents contact therebetween.

The metal part-forming insert is made from an insert top half which has a temporary open channel machined on the bottom surface thereof. The insert top half is provided with apertures to house a no-leak valve, in some instances two no-leak valves, the stub pin and a thermocouple. The adjusting body is configured to provide corresponding hardware, namely, a mating no-leak valve, in some instances two mating no-leak valves, a stub pin capture device, and a thermocouple connection to the process controller.

The injection molding machine is equipped with a thermal fluid control reservoir that is connected through the adjusting body to the mating no-leak valves. In the case of two valves, a return path through the adjusting body is also provided. The process controller monitors the fluid reservoir temperature and delivery pump to maintain the insert surface at a particular temperature based on the process parameters provided by the input unit 58. While the stub pin length may require adjustment to shim the insert height, the adjusting body, valves, and inserts may be used at various shimmed heights without additional adjustment. This axial allowance, is the same feature that helps maintain the thermal fluid seal under the varying axial force of the multi-ton clamp.

BRIEF DESCRIPTION OF THE DRAWINGS

The advantages, nature and various additional features of the invention will appear more fully upon consideration of the illustrative embodiments now to be described in detail in connection with the accompanying drawings. In the drawings, wherein like reference numerals denote similar components throughout the views.

DETAILED DESCRIPTION OF THE PREFERRED EMBODIMENTS

The invention relates to the manufacturing of injection molded ophthalmic lenses out of thermoplastics. As a non-limiting example, polycarbonate (PC) or polymethyl methacrylate (PMMA) may be used. In general, these improvements relate to straight injection molding, as opposed to injection-compression injection molding. The invention may be used to manufacture "finished" lenses in which both the front and back sides are provided with a finished curvature. Both positive and negative lenses can be made. Typically, the finished lens has a minimum center thickness of 1.15 mm.

The improvements disclosed herein may also be used to manufacture "semi-finished" lens in which the front side is provided with a finished curvature and the back surface is unfinished. The back surface is subsequently ground down to achieve the desired lens power. In order to accommodate a wide range of lens power variations, semi-finished lenses are manufactured in different thicknesses, varying from an 8 mm center thickness to 11 mm. The lab will then select the thinnest lens from which the desired power can be rendered. This selection process, helps to limit the amount of lens material that needs to be ground down, i.e. removed. When injection molding a series of such "semi-finished" lenses, it may be desirable to use the same insert to mold multiple lenses having the same curvature but with different thicknesses.

These lenses are molded with glass inserts or with metal inserts that require indirect or direct thermal control. The glass inserts are subject to breakage and wear. Indirect thermal control involves circulating a thermal fluid through channels formed in the receiver, or other part of the molding machine, as close to the insert as possible. Direct thermal control involves circulating a thermal fluid through channels formed in the insert. All thermal control systems inherently possess the risk of fluid leakage or seepage. A particular problem of mold cleanliness arises when using oil as the thermal control fluid. The problem is exacerbated as the indirect channels move closer to the inserts. When circulating oil through the inserts, O-rings or other sealants are employed to create a temporary seal that is broken during insert changeover. These seals are typically located at an interface which is subject to the multi-ton clamping and un-clamping force of the injection molding machine. Additionally, these interfaces do not allow for height adjustment of the insert position, as they must remain flush to properly seal.

Figure 1:
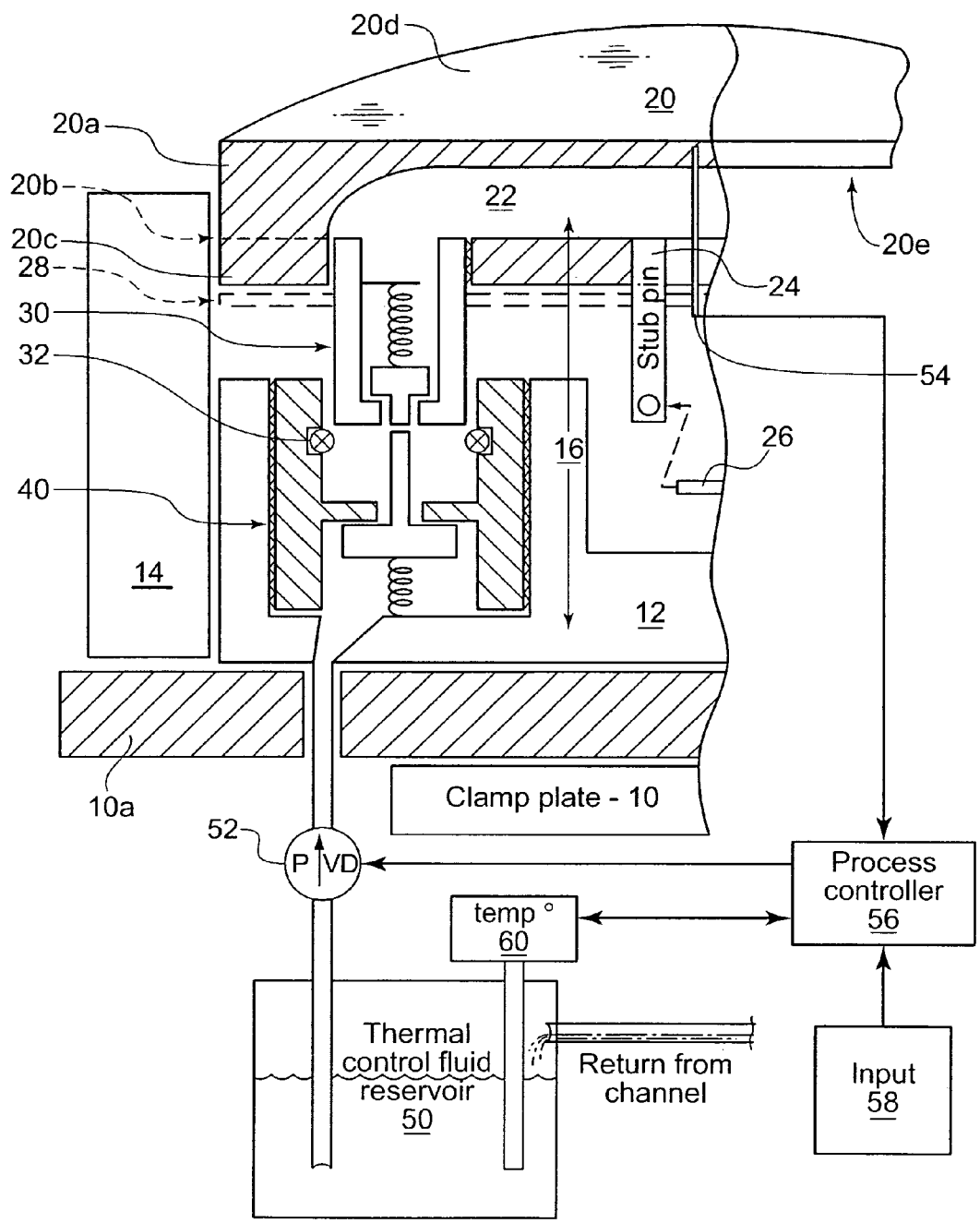
FIG. 1 is a schematic view illustrating an embodiment of a circulating loop passing through a removable insert for thermal control of its molding surface.

A description of applicant's direct thermal control system follows, with reference to FIG. 1. As stated above, direct thermal control involves circulating a fluid within the part-forming insert. Direct thermal control allows the use of a metal insert 20 that has a machined interior channel 22. More particularly, insert 20 is fashioned from two separate parts, insert top half 20a and insert bottom half 20c, that are brought together along a joint 20b after machining of the halves is complete. Insert top half 20a has an optical, part-forming surface 20d on one side thereof, and a [temporary] open channel 20e formed on the opposite side thereof. Insert bottom half 20c is fashioned to receive one or two valves along with a stub pin. For example, a threaded bore is formed completely through bottom half 20c to receive a valve, whereas, a threaded opening may be formed partly through bottom half to receive a stub pin 24. After the top and bottom halves are completely machined on all inner and outer surfaces, they are joined together to form the now completely interior channel 22 with the threaded bores receiving a valve 30 for communicating with the channel. For example, the insert halves may be fabricated from stainless steel and then joined by electron beam welding. Optionally, the part-forming surface 20d may be coated to increase durability and lubricity. For example, titanium nitride may be applied via vacuum coating. Improved lubricity allows for a much better flow of plastic within the cavity and helps to reduce the presence of knit lines.

Insert 20 is installed into the receiver 14 of the plastic injection molding machine and is supported on adjusting body 12. Though not shown for the sake of clarity, adjusting body 12 is a two piece assembly coupled together by a robust threaded connection that is capable of withstanding the multi-ton clamping force of the injection molding machine. The lower portion of the adjusting body can be rotated to move the upper portion axially within the receiver. According to the invention, adjusting body 12 has been modified to provide openings to receive one or more valves 30, a stub pin 24 and a thermocouple 54. Significantly, insert 20 rests directly on adjusting body 12, and that clamp-force-receiving planar contact zone is completely isolated from the fluid channel connection and seal. In this manner, it is possible to optionally add shims 28 between insert 20 and adjusting body 12. The addition of shims does not affect the isolation of the fluid channel connection and seal.

The insert is installed with a suitable stub pin that will extend into coupling range of a capture device 26 installed on the injection molding machine. During installation, insert valve 30 is opened by interaction with a mating no-leak valve 40. As shown schematically in the figure, the valves each contain a gate which is biased into the closed position. The valve bodies mate in a male-female configuration which may include a flexible seal 32, such as an O-ring, therebetween. As the two valves are initially pushed toward each other, the valve bodies form a seal while the gates remain closed. Further progress towards each other, causes both gates to open, by reciprocal contact which evenly overcomes the biasing [closing] force acting on each gate. Once the gates are open, a thermal control fluid from reservoir 50 can flow through a fixed or variable delivery pump 52, through the specially modified adjusting body 12, through the mating valves into channel 22. The diametrically opposed side of the insert may contain a similar valve arrangement to allow the thermal control fluid to return to reservoir 50.

The thermal fluid circulation may be monitored by a thermocouple 54 that is arranged to measure the temperature just below the part-forming surface 20d. A process controller 56 compares the measured temperature with settings from input device 58. The input may comprise settings stored in a database, with the operator selecting one set of parameters from a matrix depending on factors like the type of polymer being used, the shape and thickness of the lens being manufactured, a particular temperature profile, inter alia. In a simplified overview, controller 56 operates a temperature monitor/heater 60 for reservoir 50 along with pump speed 52 to maintain surface temperature 20d at the preset level.

Figure 2:
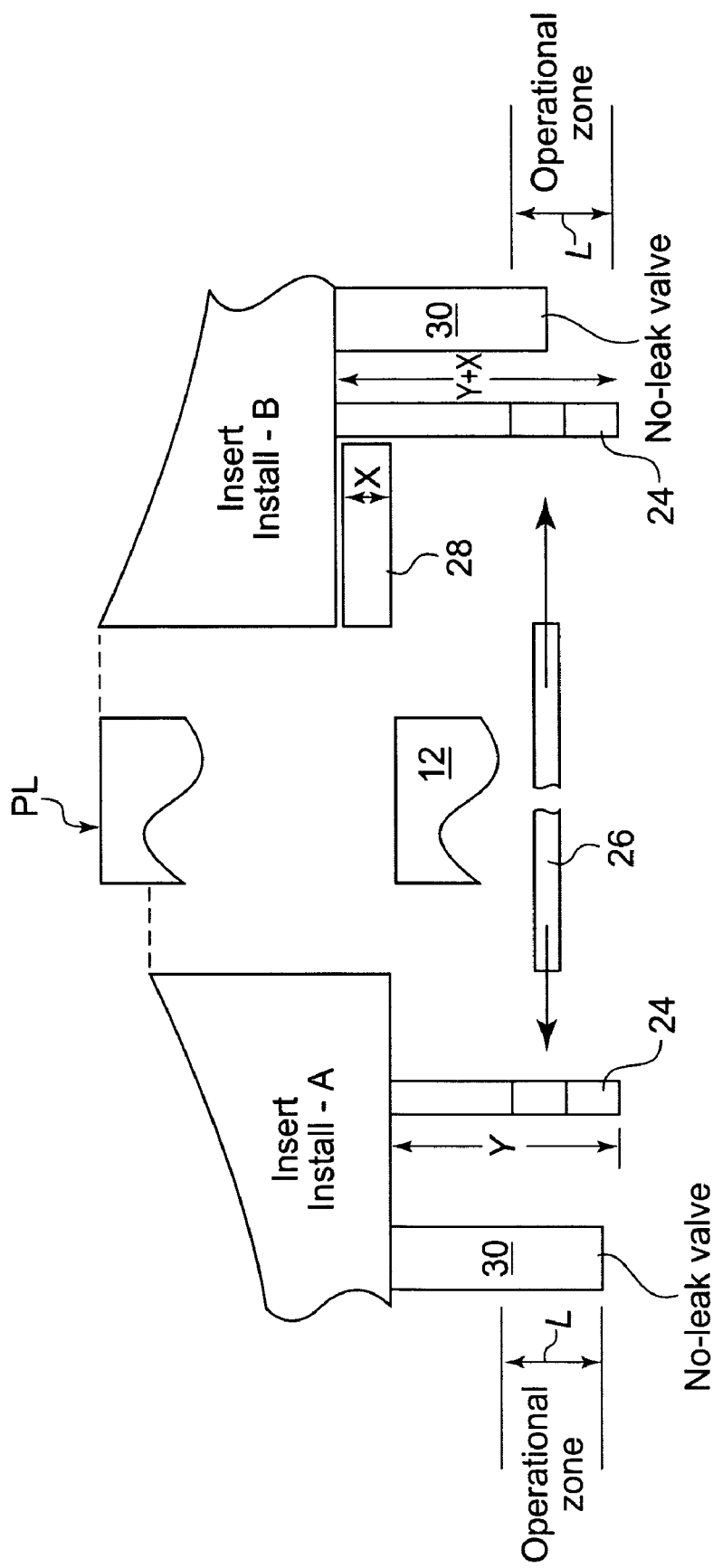
FIG. 2 is a schematic view comparatively illustrating the operational range for establishing the loop during changeover to differently positioned inserts.

FIG. 2 shows an insert installation configuration A on the left in which the insert sits directly on adjusting body 12. The parting line of the mold, adjusting body 12 and capture device 26 shown in the center of the figure, serve as common reference points for both the left and right sides of the figure. An alternate insert installation configuration B on the right shows insert positioned on top of a shim 28, which in turn sits directly on adjusting body 12. Shim 28 has a thickness X, which may be in the range of millimeters. The left stub pin has a length Y. The right stub pin has a length Y+X to account for the added thickness of the shim while extending to the same point to engage capture device 26. The far left and far right sides of the figure show a common "operational zone" for valve 30. This operational zone defines an axial range L over which the valves can be sealed and open. The axial range of the operational zone is several times larger than the illustrated shim. Therefore, the insert can be height adjusted via shims, without affecting the sealing and opening operations of the valves.

Height adjustment of the inserts is important to mold lenses at target thicknesses and to allow for molding the same shape lens at different thickness. Accordingly, the ability to rapidly interchange inserts, or remove inserts for shimming is critical to minimize equipment down-time. On the other hand, once the equipment is properly configured, direct thermal control is key to providing production efficiency in reducing cycle time, for example. In addition, thermal control allows the use of low maintenance metal inserts. The prior art thermal control systems result in open fluid channels when the inserts are removed. Oil dripping into the receiver has to be completely cleaned before resuming molding operations.

According to the invention, an insert is easily and cleanly removed by first disengaging the capture device from the stub pin. A vacuum tool can then be employed to attach onto the part-forming surface 20d, and simply withdraw the insert assembly 20 out of receiver 14. This withdrawing action will occur along axial direction 16. During the initial phase of withdrawal, the gates will move away from each other into a closing position, while the valve bodies remain sealed to each other. As the withdrawal continues, the valve bodies will become disengaged, but only after the thermal control fluid is safely sealed behind each valve. A new insert can be pre-heated [and pre-shimmed] ready for installation. Upon axial insertion the valve bodies seal, the gates open and the insert is placed into contact with [the shim and] the adjusting body. Once the stub pin is captured, molding can resume.

Functionally, the thermal control system of the invention does not interfere with standard insert shimming or exchange programs, for example, SMED systems. The capture device described above, effectively clamps the insert to the adjusting body at various heights depending on shim presence and thickness. FIG. 1 illustrates that along line 16 there is direct axial support of the insert by adjusting body 12. The same support is also provided in the instance where a shim 28 is used. Adjusting body is then supported along line 16 by the clamp plates 10 and 10a. The multi-ton clamp force of the injection molding machine is directed in the axial direction 16. So the apparatus according to the invention provides the same support for the insert as a machine that does not possess a thermal fluid control system. In addition, the seal of valve 30 to mating valve 40 will form in a concentric ring between the male and female valve bodies. For example, an O-ring 32, or other suitable sealing means may be provided, in this instance, within the female valve body. Once the male valve body is inserted beyond the O-ring 32, a seal will be maintained, regardless of any axial movement of the insert, as may occur, for example, during loading and unloading of the multi-ton clamp force.

An embodiment of the specific hardware elements which give rise to the invention are as follows. An injection molding machine having a thermal fluid source for circulating thermal fluid within a part-forming insert comprising an insert equipped with an internal channel, an adjusting body having a support surface for the insert, and a seal between the channel and the thermal fluid source that forms independently of the support surface. The locations of the male valve and the mating female valve are exemplary. Other types and configurations of no-leak valves may be employed without departing from the spirit of the invention. The valves may seal in other planes, by other than O-rings, and by alternate means. For example, one valve set may be provided which includes two side-by-side or concentric passageways therein, serving as both the channel inlet and outlet. The key feature is that the seal is operative over a range and that the seal forms independently of the support surfaces, namely the insert bottom and the adjusting body top.

The insert includes a normally closed valve located at the channel mouth. One valve may be located at the channel inlet with a second valve at the channel outlet, i.e. the points at which the internal channel enters and exits the insert. A corresponding number of mating valves are disposed within the adjusting body. The valves mate and seal before opening. The valves seal before the insert contacts the support surface. The valves seal as the insert approaches the support surface. The valves seal as a function of axial progress of the insert toward the adjusting body. A shim or shims of various thicknesses may be disposed between the insert and the support surface. Since the valves can mate, seal and open over an operative range, they can function just as easily with shims that separate the insert from the adjusting body and prevents contact therebetween.

The metal part-forming insert is made from an insert top half which has a temporary open channel machined on the bottom surface thereof. The insert top half is provided with apertures to house a no-leak valve, in some instances two no-leak valves, the stub pin and a thermocouple. The adjusting body is configured to provide corresponding hardware, namely, a mating no-leak valve, in some instances two mating no-leak valves, a stub pin capture device, and a thermocouple connection to the process controller. The shims have apertures formed therein to accommodate the valve(s), stub pin and thermocouple. The apertures do not affect the supporting function of the shims.

The injection molding machine is equipped with a thermal fluid control reservoir that is connected through the adjusting body to the mating no-leak valves. In the case of two valves, a return path through the adjusting body is also provided. The process controller monitors the fluid reservoir temperature and delivery pump to maintain the insert surface at a particular temperature based on the process parameters provided by the input unit 58. While the stub pin length may require adjustment to shim the insert height, the adjusting body, valves, and inserts may be used at various shimmed heights without additional adjustment. This axial allowance, is the same feature that helps maintain the thermal fluid seal under the varying axial force of the multi-ton clamp.

The methods and apparatus described herein are useful for molding ophthalmic lenses with edge-gated molds. The thermal control system may be used for heating or cooling the inserts. An example of cooling, is a so-called isothermal molding process, in which the circulating coolant is intended to maintain the part forming surface below the glass transition temperature $T_g$ of the thermoplastic molding material. An isothermal molding process is generally employed to reduce cycle time and improve the production efficiency of the equipment.

Alternatively, the thermal control system may be used for heating and cooling in a single molding cycle, according to a so-called non-isothermal molding process. The mold inserts are first heated to reduce the melts resistance to flow by inhibiting premature freeze-off, improve cavity filling and reduce the presence of knitlines. Once the cavity is substantially filled, the thermal control system switches into a cooling mold to rapidly solidify the part.

Having described preferred embodiments for methods and apparatus used for direct thermal control of the part-forming inserts (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of protecting an optical, part-forming surface of an insert from thermal control fluid that flows within the insert, comprising the steps of:

providing a valve on the insert to access a channel located within the insert, wherein the insert has an optical, part-forming surface;

axially installing the insert into a receiver for support on an adjusting body disposed within an injection molding machine equipped with a thermal fluid source to adjustably position the insert relative to the parting line; and opening the valve, over an axial range during installation, to allow the source to communicate with the channel so that optical parts with different thicknesses can be molded with one insert.

2. The method of claim 1, wherein the insert includes a support surface opposite the optical, part-forming surface with the channel disposed therebetween, wherein the valve is installed in the support surface which rests on the adjusting body.

3. The method of claim 2, further comprising a stub pin extending outwardly from the support surface in an axial direction.

4. The method of claim 3, wherein the valve extends axially outwardly from the support surface, parallel to the stub pin.

5. A method of protecting a part-forming surface of an insert from thermal control fluid that flows within the insert, comprising the steps of:

providing a valve on the insert to access a channel located within the insert, wherein the insert includes (i) a support surface opposite the part-forming surface, and the valve is installed in the support surface and (ii) a stub pin extending outwardly from the support surface in an axial direction, wherein the valve extends axially outwardly from the support surface, parallel to the stub pin;

installing the insert into an injection molding machine equipped with a thermal fluid source, and an adjusting body for supporting the insert and receiving the stub pin and valve; and opening the valve, during installation, to allow the source to communicate with the channel.

6. The method of claim 5, further including shims disposed between the support surface and the adjusting body.

7. The method of claim 6, wherein the shims include apertures to accommodate the stub pin and valve.

8. The method of claim 6, wherein said installing step includes axially sliding the insert into a receiver of the injection molding machine.

9. The method of claim 8, wherein said installing step further includes sliding the insert an axial distance to bring the stub pin into coupling range with a capture device.

10. The method of claim 9, wherein the capture device is a linearly-actuated capture device that extends radially inwardly to engage the stub pin.

11. The method of claim 6, wherein the opening step occurs over a range of axial displacement that is greater than the shim thickness.

12. The method of claim 1, further including the steps of:
withdrawing the insert out of the injection molding machine; and
closing the valve, during withdrawal.

13. The method of claim 1, wherein the valve is biased into a closed position.

14. The method of claim 1, wherein the injection molding machine includes a no-leak mating valve, and said opening step comprises contacting the valve with the no-leak mating valve.

15. The method of claim 14, wherein said opening step comprises, allowing the source to communicate with the channel only after a sealed connection is formed between the valve and the no-leak mating valve.

16. The method of claim 1, wherein said providing step comprises:
forming a channel within an insert top half; and
mounting the valve in an insert bottom half; and
joining the halves together to create an insert.

17. The method of claim 16, wherein the insert halves are made from metal and are electron beam welded together.

18. The method of claim 1, wherein said providing step comprises:
providing two valves on the insert.

19. The method of claim 18, wherein said opening step comprises:
opening the two valves, during installation, so that the source communicates with the channel only after a sealed connection is formed between the two valves and their respective mates on the injection molding machine.

20. A method of adjusting the position of an optical, part-forming surface of an insert relative to an injection mold parting line comprising the steps of:
providing an insert assembly comprising an insert having an internal channel for circulating thermal control fluid therethrough and a no-leak valve which can be opened over a distance L; and
adjusting the position of the insert in a receiver of an injection molding machine by shimming the insert relative to a support surface of the injection molding machine;
whereby, distance adjustments less than L can be implemented without changing the valve so that one insert assembly can be used at multiple positions relative to the parting line of the injection molding machine.

21. The method of claim 20, further comprising the step of:
providing a stub pin on the insert which is engaged by a capture device on the injection molding machine.

22. The method of claim 21, wherein said adjusting step includes selecting a stub pin having a length sufficient to align with the capture device.

23. The method of claim 22, wherein the length of the stub pin to its engagement section is the sum of the shim height and the distance from the support surface to the capture device.

24. The method of claim 23, wherein the stub pin length is increased an amount equal to the added shim height.

25. The method of claim 20, wherein said adjusting step comprises axially displacing the insert into the receiver, without the use of threaded bolts to draw the insert into position.

26. The method of claim 20, wherein distance L comprises a distance extending parallel to the central axis of the receiver.

27. The method of claim 20, further including the step of molding lenses of similar curvature and different thickness with a single insert assembly.

28. The method of claim 27, wherein the lenses include finished and semi-finished lenses having varying thicknesses.

29. The method of claim 20, wherein a single insert assembly, having a metal part-forming surface, and thermal control fluid circulating within the insert, can be used to mold lenses of similar curvatures and different thicknesses.

30. The method of claim 20, wherein the insert assembly has the channel sealed by a no-leak valve upon axially withdrawing the insert assembly beyond the operational distance L of the valve.

* * * * *